(12) United States Patent
Mittmann et al.

(10) Patent No.: US 11,796,313 B2
(45) Date of Patent: Oct. 24, 2023

(54) POSITION-MEASURING DEVICE

(71) Applicant: DR. JOHANNES HEIDENHAIN GmbH, Traunreut (DE)

(72) Inventors: Rudolf Mittmann, Tacherting (DE); Ingo Joachimsthaler, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 1546 days.

(21) Appl. No.: 14/270,391

(22) Filed: May 6, 2014

(65) Prior Publication Data

US 2014/0336979 A1 Nov. 13, 2014

(30) Foreign Application Priority Data

May 10, 2013 (DE) .................... 10 2013 208 629.6

(51) Int. Cl.
*G01B 21/16* (2006.01)
*G01D 5/244* (2006.01)
*G01D 21/00* (2006.01)

(52) U.S. Cl.
CPC ............. *G01B 21/16* (2013.01); *G01D 5/244* (2013.01); *G01D 21/00* (2013.01)

(58) Field of Classification Search
CPC ........ G01B 21/16; G01D 21/00; G01D 5/244; G06F 17/30
See application file for complete search history.

(56) References Cited

U.S. PATENT DOCUMENTS

| 5,418,357 A * | 5/1995 | Inoue ................. G06K 7/10881 235/462.11 |
| 5,687,103 A | 11/1997 | Hagl et al. |
| 6,043,768 A | 3/2000 | Strasser et al. |
| 6,907,595 B2 * | 6/2005 | Curd ................... G06F 15/7867 326/39 |
| 8,300,221 B2 * | 10/2012 | Cho ...................... B82Y 35/00 356/365 |
| 2001/0055422 A1 * | 12/2001 | Roustaei ............ G06K 7/10811 382/181 |
| 2006/0159331 A1 | 7/2006 | Kubo et al. |

(Continued)

FOREIGN PATENT DOCUMENTS

| DE | 202008014764 U1 | 4/2009 |
| EP | 0 660 209 A1 | 6/1995 |

(Continued)

OTHER PUBLICATIONS

Goldstein, Adam, Applescript: the missing manual (O'Reilly Media 2005).*

(Continued)

*Primary Examiner* — Regis J Betsch
(74) *Attorney, Agent, or Firm* — LEYDIG, VOIT & MAYER, LTD.

(57) ABSTRACT

A position-measuring device includes a measuring transducer configured to carry out a position measurement. The position-measuring device has at least one memory having stored parameter data defining an active configuration under which the position-measuring device is operable. The at least one memory further has data and instructions useable to activate at least one further configuration under which the position-measuring device is operable.

17 Claims, 5 Drawing Sheets

(56) References Cited

U.S. PATENT DOCUMENTS

| | | | | |
|---|---|---|---|---|
| 2008/0186470 A1* | 8/2008 | Hipp | ............... | G01S 7/4815 356/5.08 |
| 2010/0023304 A1 | 1/2010 | Bund | | |
| 2010/0039391 A1* | 2/2010 | Spink | ............... | G01B 21/047 345/173 |
| 2010/0250911 A1 | 9/2010 | Trebbels et al. | | |
| 2010/0324737 A1 | 12/2010 | Handa et al. | | |
| 2011/0213586 A1* | 9/2011 | Kobler | ............... | G01D 5/244 702/150 |
| 2013/0185546 A1 | 7/2013 | Rossello | | |
| 2013/0305206 A1* | 11/2013 | Pandev | ............... | G06F 17/5081 716/136 |
| 2014/0117081 A1* | 5/2014 | Jablonski | ............... | G06F 19/326 235/375 |
| 2015/0276402 A1* | 10/2015 | Grasser | ............... | G01C 15/06 702/150 |

FOREIGN PATENT DOCUMENTS

| | | | |
|---|---|---|---|
| EP | 0660209 | A1 | 6/1995 |
| EP | 0790489 | A1 | 8/1997 |
| EP | 2148522 | A2 | 1/2010 |
| JP | H 10103918 | A | 4/1998 |
| JP | 2004318439 | A | 11/2004 |
| JP | 2009075136 | A | 4/2009 |
| JP | 2009250708 | A | 10/2009 |
| JP | 2011022133 | A | 2/2011 |
| WO | 2010/116145 | A2 | 10/2010 |
| WO | 2010116145 | A2 | 10/2010 |

OTHER PUBLICATIONS

Wikipedia: Computer, https://web.archive.org/web/20130425070028/https://en.wikipedia.org/wiki/Computer, retrieved by Archive.org on Apr. 25, 2013.*

Wikipedia: Ruler, https://web.archive.org/web/20130201205523/https://en.wikipedia.org/wiki/Ruler, retrieved by Archive.org on Feb. 1, 2013.*

Wikipedia: Barcode, https://web.archive.org/web/20130424165017/https://en.wikipedia.org/wiki/Barcode, retrieved by Archive.org on Apr. 24, 2013. (Year: 2013).*

Wikipedia: Barcode Reader, htps://web.archive.org/web/20130201024846/ https://en.wikipedia.org/wiki/Barcode_reader, retrieved by Archive.org on Feb. 1, 2013. (Year: 2013).*

Wikipedia Semiconductor Memory, https://web.archive.org/web/20130426042954/https://en.wikipedia.org/wiki/ Semiconductor_memory, retrieved by Archive.org on Apr. 26, 2013. (Year: 2013).*

Wikipedia: Instruction register <https://en.wikipedia.org/w/index.php?title=Instruction_register&oldid=524286962> version Nov. 22, 2012 (Year: 2012).*

Wikipedia: Memory management < https://en.wikipedia.org/w/index.php?title=Memory_management&oldid=526227792> version Dec. 3, 2012 (Year: 2012).*

Alfons Ernst, Digital Linear and Angular Metrology Position Feedback for Machine Manufacture and the Electronics Industry, Dr. Johannes Heidenhain GmbH, verlag moderne industrie, Landsberg/Lech, Germany, pp. 1-95 (Dec. 1998).

* cited by examiner

*Angle encoder with integral bearing: simplified view*
W Shaft
K Precision ball bearing
T Graduated disk
L Semiconductor light source
A Scanning reticle
P Photodiodes
G Housing

POSITION-MEASURING DEVICE

CROSS-REFERENCE TO PRIOR APPLICATION

Priority is claimed to German Patent Application No. DE 10 2013 208 629.6, filed on May 10, 2013, the entire disclosure of which is hereby incorporated by reference herein.

FIELD

The present invention relates to a position-measuring device, and to a method for programming the position-measuring device.

Such a position-measuring device, in particular in the form of a length-measuring device or an angle-measuring device, includes a measuring transducer for carrying out a position measurement, and a memory for storing parameter data defining a configuration under which the position-measuring device can be operated.

BACKGROUND

The measuring transducer of a position-measuring device may be implemented, for example, in that a scanning unit of the position-measuring device scans an associated measuring standard connected to a body that is movable relative to the scanning unit. In this way, it is possible to determine the position of that body relative to the scanning unit (position measurement).

The configuration defined by the parameter data stored in the memory may determine, for example, the resolution at which the position-measuring device is to operate, as well as the interface via which the position-measuring device is to be connected to an associated evaluation unit, etc.

Depending on the application for which a position-measuring device is currently used, it may be necessary to change its configuration; i.e., for example, to adapt its configuration to a new application. From EP 0 660 209 A1, for example, it is known to provide a position-measuring device with a memory area in which parameter data supplied to the position-measuring device from external sources can be stored to define a specific configuration of the position-measuring device. For this purpose, a data processing device is needed which is compatible with the position-measuring device to be programmed and which stores the parameter data coming from an external data source in the memory area of the position-measuring device that is intended for this purpose.

SUMMARY

In an embodiment, the present invention provides a position-measuring device. The position-measuring device includes a measuring transducer configured to carry out a position measurement and at least one memory having stored parameter data defining an active configuration under which the position-measuring device is operable. The at least one memory further has data and instructions useable to activate at least one further configuration under which the position-measuring device is operable.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
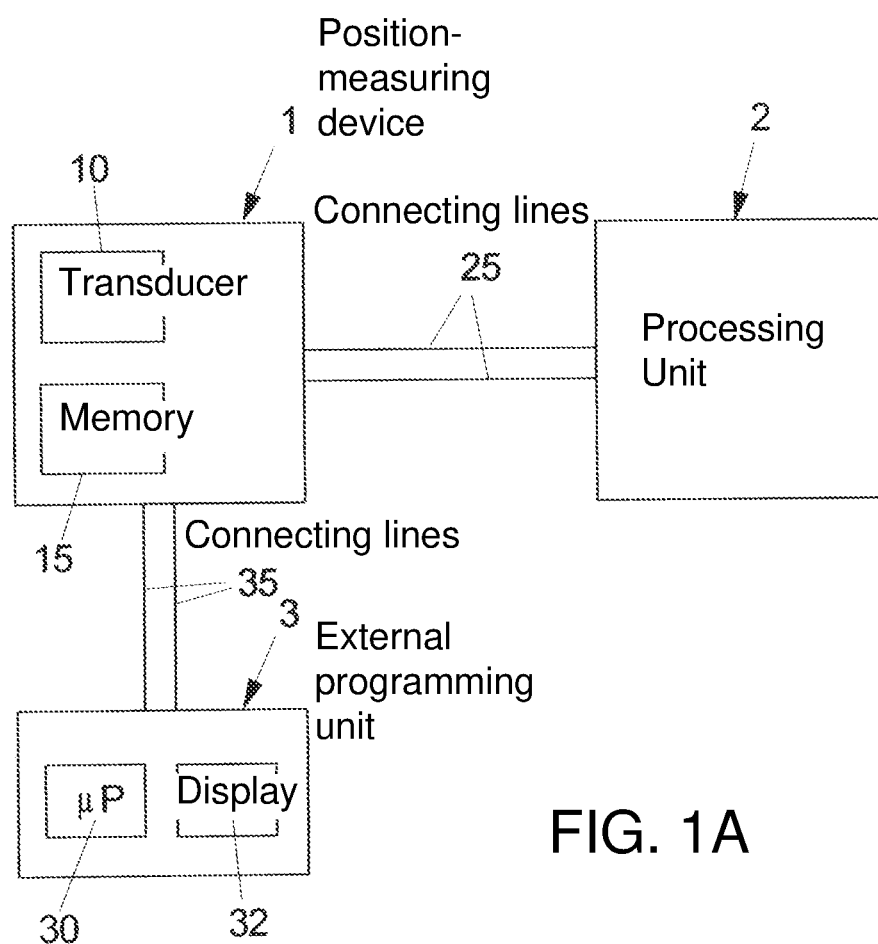
FIG. 1 is a schematic view showing a position-measuring device and an associated programming unit.

The present invention, in an embodiment, further simplifies the programming of a position-measuring device of the type mentioned at the outset.

According to an embodiment, a memory of a position-measuring device of the type described has stored therein data and instructions which can be used to activate or create at least one further configuration under which the position-measuring device can also be operated and which differs from the configuration (default configuration) that is available in the position-measuring device anyway.

Thus, different configurations for operating the position-measuring device are available to the user, of which the one that is suitable for a particular application can be selected and activated without additionally having to access external data sources, such as external memories or databases. This is because the data needed to set up the at least one further configuration on the position-measuring device is available in a memory of the position-measuring device itself.

In addition, the position-measuring device has also stored therein the instructions necessary to reconfigure the position-measuring device, such as those indicating the steps to perform in order to reconfigure the position-measuring device using particular parameter data.

In order to reconfigure the position-measuring device to enable it to operate under a different configuration, there is no need for external data sources, and there is also no need to provide a data processing device specifically tailored to the respective position-measuring device to perform the reprogramming of the position-measuring device. Rather, a universal programming unit (having a processor) capable of reprogramming very different position-measuring devices may be used for this purpose. The programming unit merely needs to be able to recognize the configuration options available in a position-measuring device, and to then execute the instructions associated with a selected configuration. This may be accomplished, for example, by an index of configuration options which is stored in the position-measuring device in addition to the data and instructions for defining different configurations and which can be read by the programming unit.

The available configuration options may be displayed on the programming unit, and the desired configuration may be selected either automatically or by a user. Then, the programming unit triggers the reprogramming of the position-measuring device to generate a new configuration under which the latter is to operate, and does so using data and instructions which are stored in the position-measuring device itself.

Therefore, the programming unit does not need to obtain the data required to reprogram the position-measuring device via an external data source, nor does it need to have device-specific instructions or program sequences tailored to a particular position-measuring device to be programmed in order to be able to reprogram the position-measuring device. Rather, both the data and the instructions required for reprogramming are available in the position-measuring device itself.

Thus, a user of a position-measuring device can reprogram the configuration thereof without having to access external data sources and without having to have a programming unit specifically designed for the particular position-measuring device. Rather, one universal programming unit can be used to reprogram different position-measuring devices to change their configuration, using the data and instructions stored therein and without accessing external data sources.

A respective further configuration may also have instructions associated therewith which, for purposes of cyclic redundancy checking (CRC), check CRCs or checksums and correct them, if necessary, if the respective further configuration is to be activated as the new current configuration.

The entirety of instructions associated with a respective further configuration altogether constitutes a program code to be executed by the external programming unit and its processor. Thus, the programming unit performs the function of an interpreter. Accordingly, a relatively low processing power is needed for the programming unit, so that it can be implemented, for example, by a simple microcontroller (having a display and a keyboard or keypad). Electrical power could be supplied to the programming unit via an USB connection, thus eliminating the need for a power supply unit. Moreover, it is also possible to incorporate a storage battery in the programming unit to enable wireless operation.

When reprogramming the position-measuring device using the programming unit, the position-measuring device may also be used to electrically power the programming unit. Since reprogramming usually takes only little time, only a relatively small amount of energy is required.

The position-measuring device may initially be programmed such that a particular configuration is used as a default configuration allowing immediate operation of the position-measuring device, and that further configurations are each provided by a set of data and associated instructions which are stored in a memory of the position-measuring device and allow the position-measuring device to be reprogrammed to use a respective selected one of the further configurations.

In accordance with a first embodiment of the present invention, all data defining a further configuration is stored in the position-measuring device for this configuration.

In accordance with another embodiment, the memory requirements can be reduced if the data stored in the memory for a further configuration includes only the data in which this further configuration differs from another (the first) configuration. The programming of said further configuration on the position-measuring device is then performed on the basis of that first configuration in such a way that only the data in which the new configuration to be programmed differs from the first configuration is changed, in particular overwritten.

In an embodiment, this requires that the first configuration, on the basis of which the new configuration is to be generated, be currently programmed; i.e., activated, as the currently usable configuration of the position-measuring device. To this end, specifically, the position-measuring device may have a default configuration which is automatically activated as the currently usable configuration of the position-measuring device not only at the time of delivery of the position-measuring device, but also before each reprogramming operation. Then, for all further configurations, it is necessary to store only the data in which the respective further configurations differ from the default configuration, as well as the associated instructions by which this data is written to the respective memory areas of the position-measuring device to redefine the currently usable configuration.

Furthermore, the memory required for storing a respective further configuration can be reduced if, in order to activate this configuration, sub-areas of the memory are to be occupied by the same datum at a plurality of memory locations. In this case, the datum intended to occupy the respective sub-area of the memory initially needs to be stored only once in the position-measuring device, along with corresponding instructions which cause that datum to be multiply copied to those sub-areas of the memory in which the respective currently active configuration is to be stored.

Moreover, the position-measuring device may have stored therein individual program blocks or partial configurations which can be used (invoked) to establish further configurations.

If necessary, an access code may be associated with a further configuration to limit access to the respective configuration to particular users. For example, it may be provided that some configurations are activatable by any user of the position-measuring device, while other configurations may, for example, only be activatable by field service personnel of the manufacturer.

Moreover, the further configurations may be stored in the position-measuring device in at least partially encrypted form.

Individual data words of a configuration, which may potentially be overwritten when activating another configuration, may be masked to limit overwriting to individual bits or bytes of the data word. This makes it possible to prevent, for example, overwriting of adjustment values.

The present invention further provides, in an embodiment, a system including a position-measuring device designed according to an embodiment of the present invention as well as an associated programming unit, and, in another embodiment, a method by which a position-measuring device designed according to an embodiment of the present invention can be reprogrammed to activate another configuration.

Figure 1B:
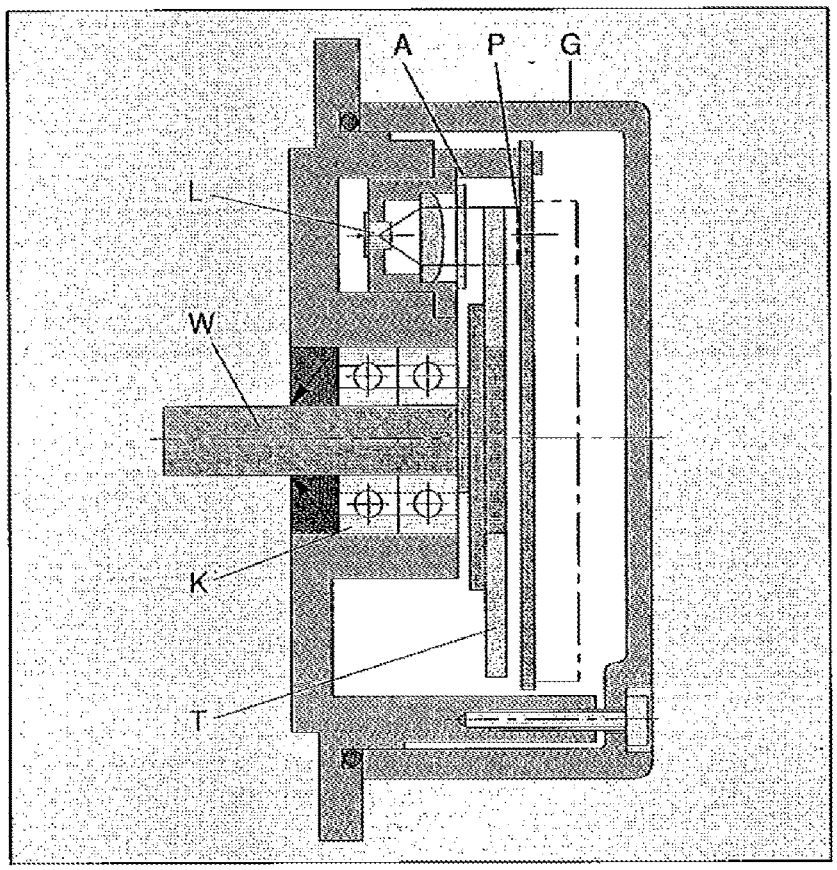

FIG. 1 shows a position-measuring device 1 including, in known manner, components such as a measuring transducer 10 and a memory 15, for example in the form of an Electrically Erasable Programmable Read-Only Memory (EEPROM).

Measuring transducer 10 serves to produce position measurement values, for example, by detecting the change in the position of two objects relative to each other. For this purpose, the measuring transducer 10 may include a measuring standard and an associated scanning unit, which are each associated with a respective one of the two relatively movable objects. By scanning the measuring standard with the scanning unit provided for this purpose, the measuring transducer 10 generates an output signal which is representative of the position of one object relative to the other object and which is usually conditioned in the position-measuring device prior to being transmitted to processing unit 2 for further processing and evaluation.

Position-measuring device 1 may in particular be in the form of a length-measuring device or an angle-measuring device, but this is not relevant here. The same applies analogously to the measurement principle used (e.g., electro-optical, inductive or magnetic) and to the type of position measurement values produced (incremental or absolute position information).

What is concerned here is the configuration of position-measuring device 1, which is defined and determined by a set of parameter data. This concerns, for example, the type of interface through which position-measuring device 1 interacts with an associated processing unit 2 via connecting lines 25, as well as the resolution of the position measurements that can be performed by the position-measuring device. Other examples of characteristics of position-measuring device 1 which are determined by its configuration include the output format of the position measurement values and the content of an electronic nameplate. In addition, certain functions may be activated or deactivated depending on the configuration of position-measuring device 1, such functions including, for example, output of additional information (e.g., measurement values of additional sensors concerning temperature and/or acceleration) and their data format, processing of additional functions (e.g., concerning diagnostic options and safety settings), additional generation of analog output signals, use of compensation mechanisms (e.g., amplitude correction, offset correction and/or phase correction), etc.

In order to define or establish a configuration under which position-measuring device 1 is to operate, the required parameter data is stored in memory 15 of position-measuring device 1. Normally, the manufacturer of a position-measuring device sets up a particular configuration with which the position-measuring device is delivered and can be put into operation.

Depending on the particular application of the position-measuring device, such as the type of measurements to be performed by it, the ambient conditions, and the type of a processing unit to be connected thereto, it may be desired to operate a position-measuring device under a configuration that differs from the originally provided configuration in order, for example, to be able to connect the position-measuring device to the processing unit via a different interface, or to be able to perform measurements at a different resolution.

Figure 2:
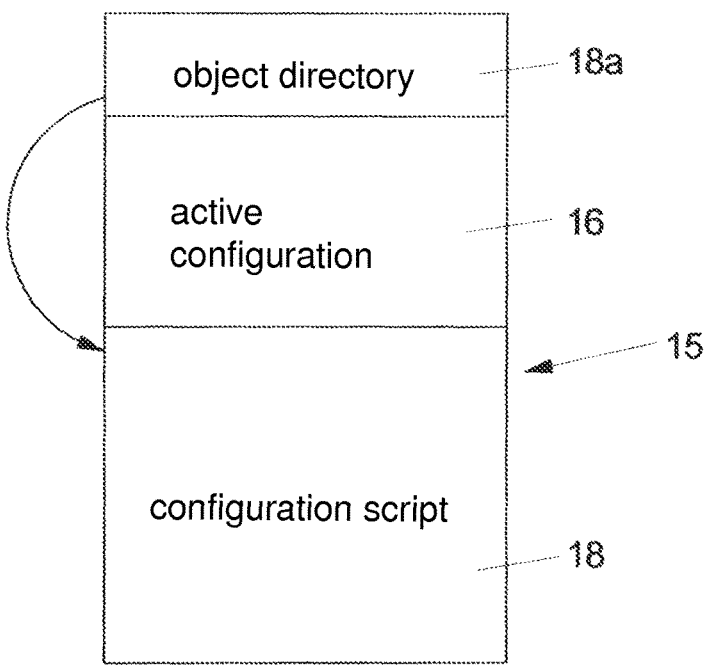
FIG. 2 is a schematic view of a memory of a position-measuring device, in which are stored a default configuration and further configurations.

To this end, memory 15 of position-measuring device 1 has stored therein not only the default configuration originally programmed by the manufacturer, but also further data and instructions which can be used to create/activate at least one further configuration, in particular a plurality of further configurations, of the position-measuring device in addition to the default configuration provided by the manufacturer. This will be explained in greater detail below with reference to FIG. 2.

Accordingly, in addition to the originally active configuration 16 programmed by the manufacturer, memory 15 has also provided therein a configuration script 18 containing the data and instructions with which at least one further configuration which is different from default configuration 16 and under which the position-measuring device can operate can be activated instead of default configuration 16. If required, configuration script 18 can be stored in encrypted form in the memory of position-measuring device 1.

The instructions included in configuration script 18 form a program code which can be executed to replace default configuration 16 of position-measuring device 1 by a different configuration, as will be apparent from the description of various embodiments with reference to FIGS. 3 through 6. To this end, configuration script 18 includes not only the required instructions, but also the data which, in order to create a new active configuration, is copied by these instructions to the areas of memory 15 that are intended for the respective active configuration.

Memory 15 of position-measuring device 1 further has stored therein an information system, here in the form of an object directory 18a, which indicates whether a configuration script 18 is stored in memory 15 and which may identify the memory area in which configuration script 18 is stored.

Configuration script 18, in turn, includes not only the data and instructions with which the individual further configurations may be activated or created, but also an index listing the further configurations that can optionally be activated.

In order to activate a further configuration of position-measuring device 1 that is different from default configuration 16, the configuration script is executed in a specific way; i.e., such that the currently active configuration is replaced with a predetermined different further configuration. To this end, a programming unit 3 may be connected (via connecting lines 35) to position-measuring device 1, as indicated in FIG. 1.

As an alternative to connecting programming unit 3 using separate connecting lines 35, programming unit 3 could also be connected to position-measuring device 1 via connecting lines 25 (interface), which are also used to connect position-measuring device 1 and processing unit 2 (and via which the respective measurement values are transmitted during the measurement mode). The programming operation (programming mode) could then be activated by a special interface command or a special function. In this variant, programming unit 3 could also be implemented by a data processing program (software) in the processing unit.

Programming unit 3 provides, in particular, a processor 30 (e.g., in the form of a microprocessor) capable of processing or executing the configuration script 18 stored in memory 15 of position-measuring device 1 in order to change the active configuration of position-measuring device 1.

The use of an additional programming unit 3 for executing the configuration script stored in memory 15 of position-measuring device 1 is necessary because position-measuring device 1 itself does not have a processor capable of executing configuration script 18.

While it is possible to provide position-measuring device 1 with such a processor, this would involve considerable additional complexity and additional cost in the manufacture of a position-measuring device. In contrast, the design of position-measuring device 1, as proposed herein and described with reference to FIGS. 1 and 2, allows a plurality of different, even differently configured, position-measuring devices not having their own processor to be reconfigured in a simple manner using a single programming unit 3.

A programming unit 3 by means of which the configuration of a particular position-measuring device 1 is to be changed does not need to be provided with a special program tailored to a respective position-measuring device. Rather, the data and instructions required for this purpose are already stored in the respective position-measuring device 1 itself, as described hereinbefore with reference to FIGS. 1 and 2.

This also means that programming unit 3 does not need to access external data sources, such as databases, when creating a new configuration in a particular position-measuring device 1, because the data required to activate a new configuration of position-measuring device 1 is also already stored in the respective position-measuring device (together with the instructions to be executed).

Figure 3:
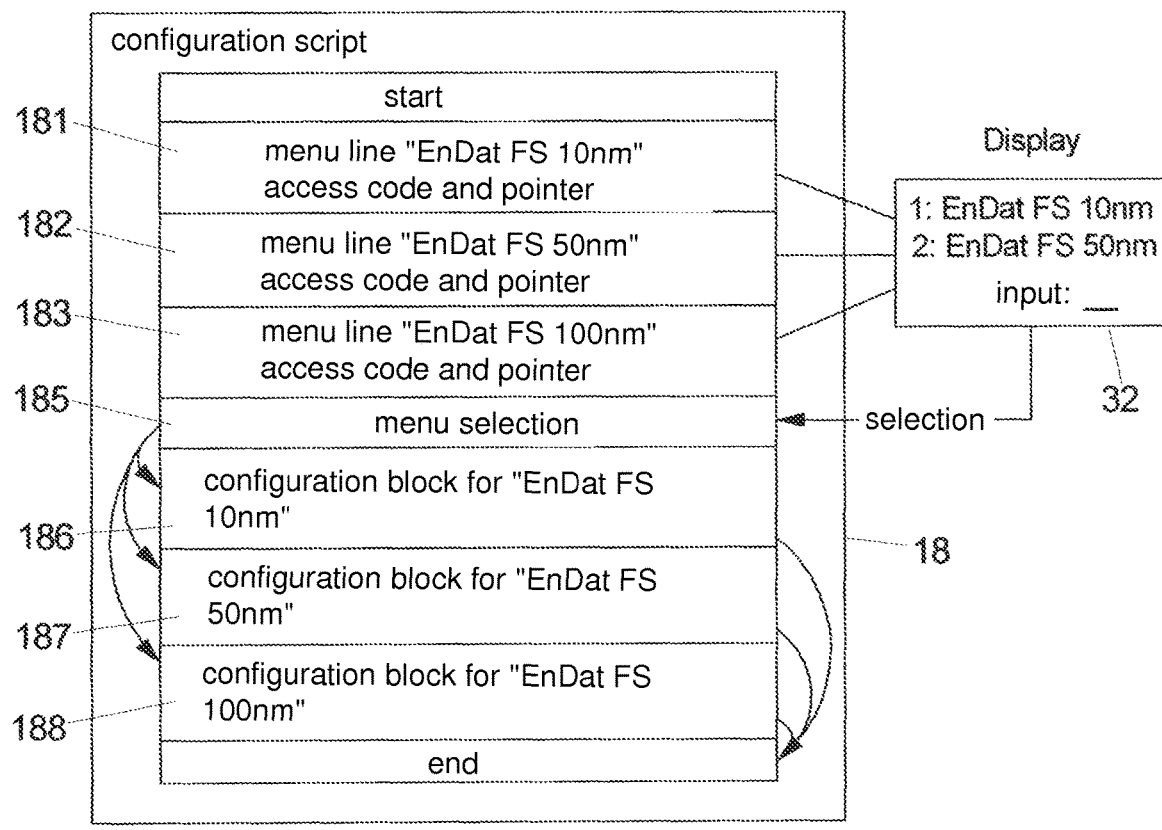
FIG. 3 is a diagram illustrating a configuration script which allows the position-measuring device to be reprogrammed with respect to the respective active configuration.

An example of a configuration script 18 is shown in FIG. 3. In the exemplary embodiment, the index of this configuration script 18 contains three entries 181, 182, 183, each of which identifies a particular further configuration intended to be activatable by means of configuration script 18. A so-called configuration block 186, 187, 188 is stored in configuration script 18 for each of these three configurations, each configuration block containing the data and instructions required to activate the respective further configuration. In the present case, the three further configurations differ in the resolution (10 nm or 50 nm or 100 nm) at which the position measurements are performed under the respective configuration.

When a programming unit 3 having a keyboard and a display 32, as shown in FIG. 1, is connected to a position-measuring device 1 containing a configuration script 18 of the type shown in FIG. 3, then the display 32 of the programming unit displays a selection menu, which summarizes the configuration options of the configuration script 18 stored in the position-measuring device and does so based on the index associated with the configuration script and containing entries 181, 182, 183. In other words: the names of the respective configurations in entries 181, 182, 183 of the index of configuration script 18 each also serve as a menu line for display of a corresponding selection menu on display 32 of programming unit 3.

In the exemplary embodiment, each individual configuration has an access code associated therewith, so that access to the individual configurations may be limited to particular users. In the present case, it is assumed that the user who wishes to reprogram position-measuring device 1 by activating another configuration in accordance with FIG. 3 using a programming unit 3 can only access the first two configurations and the associated entries 181, 182 in the index, as well as the corresponding configuration blocks 186, 187. In this case, only the first two entries 181, 182 of the index stored in the position-measuring device are presented in a selection menu on the display 32 of the programming unit, according to configurations using a resolution of 10 nm and 50 nm, respectively.

In order to carry out this first step during the activation of a new configuration of position-measuring device 1, programming unit 3 only needs to be able to read the relevant data from the index of the configuration script 18 stored in position-measuring device 1.

One of the available configurations displayed on display 32 can then be selected via a block 185 ("menu selection") of configuration script 18 using programming unit 3.

After selecting one of the configurations using the programming unit, the respective configuration block (186 or 187) is processed by executing the instructions associated with the configuration block and thereby copying the data associated with the configuration block to that area of the memory 15 of position-measuring device 1 in which to store the respective configuration under which position-measuring device 1 is currently to operate. In the process, data of the (other) configurations last present in this memory area is overwritten as needed.

In order to carry out this further step, programming unit 3 is adapted (programmed) to execute, using its processor 30, the instructions that are associated with the respective configuration block (186 or 187).

Thus, a single programming unit can be used to reprogram very different position-measuring devices by changing the respective active configuration. It is merely necessary that the programming unit be able to read the index of a configuration script stored in the respective position-measuring device and optionally display it to a user in the form of a menu on the programming unit's own display (unless the selection of a configuration is to be performed automatically). Moreover, the programming unit must be able to execute, using its processor, the instructions associated with a particular configuration of the configuration script, so that the data associated with the selected configuration is copied to a memory area of the position-measuring device that is intended for the currently active configuration.

Figure 4:
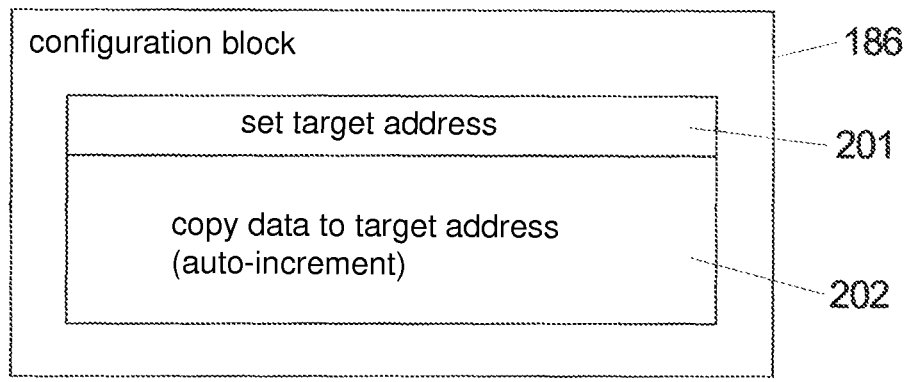
FIG. 4 is a diagram showing a configuration block by which a particular configuration on the position-measuring device can be activated.

In a first embodiment, the activation of a new configuration is performed, as shown in FIG. 4, in such a way that during processing of the configuration block to be processed (e.g., configuration block 186), in a first step 201, the target address for the data to be copied is selected, and then, in a step 202, the data is copied to this target address; i.e., to the memory area intended for the respective active configuration. In the process, the data previously present in that memory area is overwritten.

Figure 5:
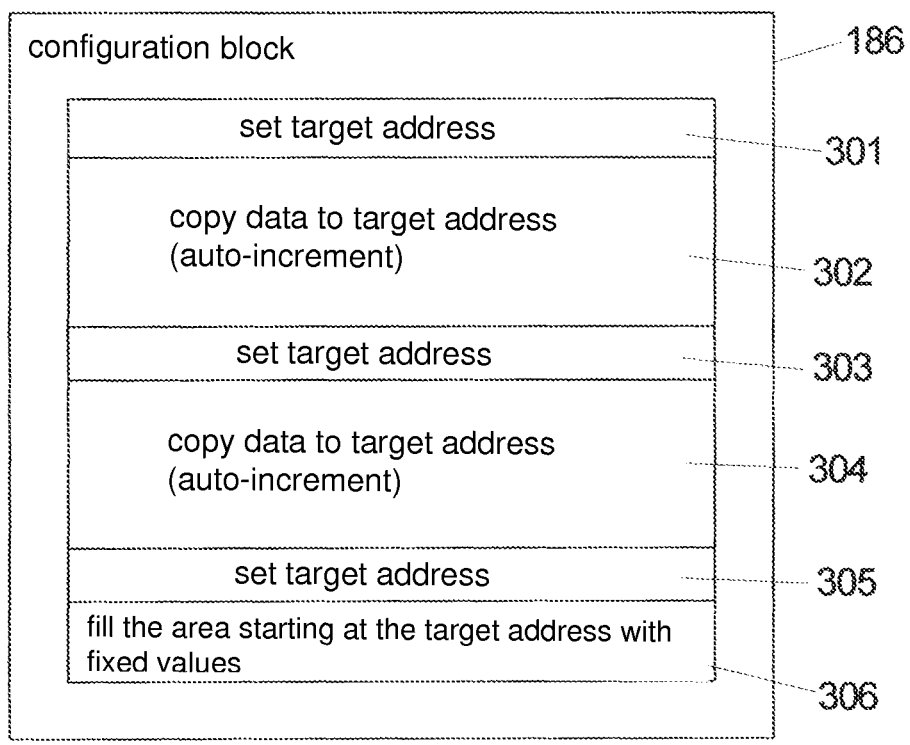
FIG. 5 is a diagram showing a modification of the configuration block of FIG. 4.

Another possible embodiment and execution of a configuration block 186 is illustrated in FIG. 5. In accordance with this exemplary embodiment, the configuration block does not need to contain all data associated with the corresponding configuration. Rather, the configuration block contains only the data in which the configuration to be activated therewith differs from another possible configuration (reference configuration) of the position-measuring device. If the last-mentioned configuration is currently active, then the selected new configuration can be created in a very simple manner by overwriting only that data of the last active configuration in which the new configuration differs from the latter. This allows a respective configuration; i.e., the associated configuration block including the data and instructions required to activate the configuration, to be stored in the position-measuring device in a memory-saving manner.

An example of a suitable reference configuration is a default configuration that was already activated (e.g., by the manufacturer) when the position-measuring device was put into operation for the first time. For all further configurations (different from that default configuration) to be stored as potentially activatable configurations in the position-measuring device, only that data needs to be stored in which the respective further configuration differs from the default configuration, as well as those instructions by which that data can be copied to the respective memory areas, with parameter data of the default configuration in each case being overwritten to create new active parameter data.

The latter is illustrated in FIG. 5, where in three steps 301, 303 and 305, different target addresses; i.e., different sub-areas of memory 15 (see FIG. 1), are selected into which data of the new configurations to be activated is to be copied according to the respective steps 302, 304 and 306 in order to selectively overwrite particular parameter data of the previous configuration Prior to performing these copying steps 302, 304, 306, the target address is in each case set (i.e., moved) in the aforementioned steps 301, 303, 305 in such a way that the data of the new configuration to be activated is in each case written to the correct sub-area of memory 15 that is intended for this purpose.

Last copying step 306 is special because in this copying step, the same datum is written to a particular sub-area of the memory at all memory locations. In this case, it suffices if the respective datum is stored once as a part of configuration block 186. It is then copied to all memory locations of the respective sub-area of the memory by means of corresponding instructions of configuration block 186. In this way, the memory requirements of the individual configuration blocks can be further reduced. In other words: an individual datum of configuration block 186 is multiply copied to that memory area of the position-measuring device in which to store the respective active configuration, so that a sub-area of that memory area is multiply occupied with that datum (at a plurality of memory locations).

If, as described in FIG. 5, for each of one or more further configurations, a respective different configuration, in particular the default configuration, is selected as the reference configuration that only needs to be partially changed in order to activate a newly selected further configuration, then this reference configuration (in particular in the form of the default configuration) is in each case to be stored in that memory area of position-measuring device 1 which is intended for the currently active configuration before the currently selected further configuration can be created therefrom by the corresponding changes. To this end, it may be provided, for example, to first activate the reference configuration (i.e., in particular the default configuration); i.e., store it into the memory area intended for the respective active configuration, each time before a new configuration is activated.

This can be easily accomplished in that the reference configuration/default configuration is not only initially stored in that memory area of the position-measuring device which is intended for the respective active configuration, but additionally also once in the memory area that is intended for the optionally activatable further configurations. This allows the reference configuration/default configuration to be restored over and over again, so that then only the data that differs from the reference configuration/default configuration, as well as the instructions provided to copy this data, need to be available to create the further configurations.

Figure 6:
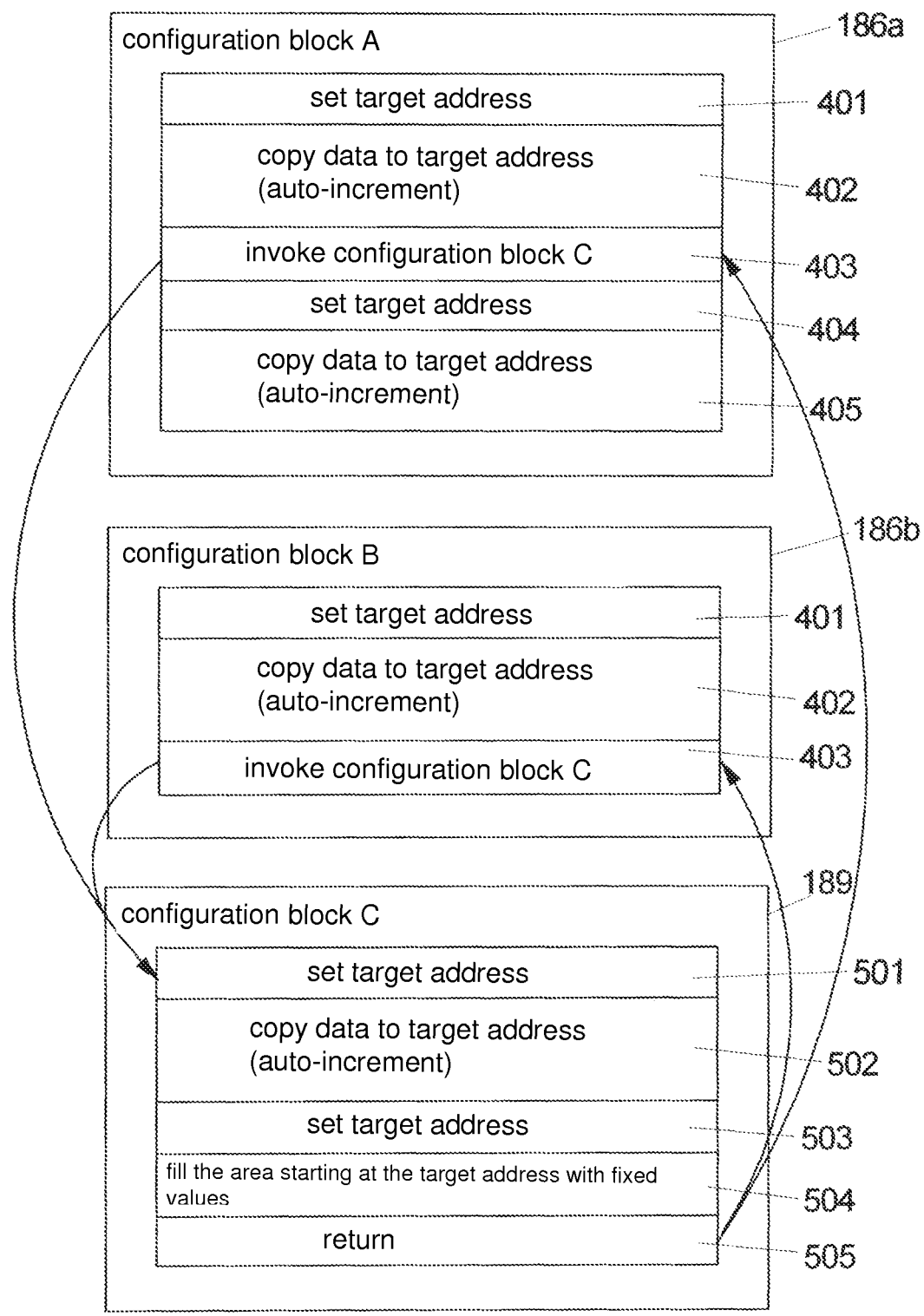
FIG. 6 is a diagram illustrating a possible interaction of different configuration blocks.

In the exemplary embodiment shown in FIG. 6, two different configuration blocks 186a, 186b access the same sub-block 189 as they are processed. Access of a plurality of different configuration blocks 186a, 186b, . . . to one and the same sub-block 189 is useful if the different configuration blocks 186a, 186b, . . . each have to perform some identical steps as they are processed. These steps can then be combined in said sub-block 189.

In the present case, sub-block 189 is designed such that during processing thereof, in steps 501 and 503, different sub-areas of that memory area in which to store the respective configuration to be activated are addressed, and that in a respective further step 502 or 504, data is then copied to the respective sub-area. Then, in a step 505, the processing of the configuration block 186a or 186b that previously invoked sub-block 189 in a step 403 is caused to be resumed.

In the exemplary embodiment, the two configuration blocks 186a and 186b differ in that during the processing of configuration block 186a, further steps 401, 402 and 404, 405, respectively, are to be performed both before and after sub-block 189 is invoked, while in the case of the other configuration block 186b, further steps 401, 402 are performed only before sub-block 189 is invoked.

In the exemplary embodiment, the steps 401, 402, 404, 405 mentioned, in turn, consist in that particular sub-areas of the memory area that is intended for the configuration to be activated are addressed, and data of the configuration to be activated is stored into these sub-areas.

By combining steps 501 through 504, which may occur during processing of different configuration blocks 186a, 186b, into one sub-block, the memory requirements of configuration script 18 are further reduced.

In summary, the configuration blocks defining respective potentially activatable configurations of a position-measuring device 1 constitute a combination of a program code formed of a plurality of instructions and the data to be processed by this program code. This instructions include, firstly and in particular, copying instructions which allow the data associated with a particular configuration block or with the corresponding configuration to be copied to that memory area of the position-measuring device in which to store the currently active configuration. Further relevant instructions are provided, for example, for determining a target address in the memory, for jumping to other blocks ("jump"), for returning ("return"), for calling other blocks ("call"), for identifying a jump target, for executing conditional jumps (in order to evaluate simple variables), as well as for checking or correcting CRCs or checksums.

In this connection, programming unit 3 forms an associated interpreter which must be able to read the data stored in the configuration script of position-measuring device 1, and to execute the instructions stored therein.

The technical approach described above may also be applied to existing position-measuring devices, provided they have a memory in which a configuration script can be stored.

This approach can be implemented for very different position-measuring devices using a universal programming unit. The programming unit only needs to be able to read the configuration options (listed in the index of the configuration script) from the memory of the respective position-measuring device using a device-independent method (defined once), and to then reprogram the configuration of the position-measuring device using the instructions and data stored in the memory of the position-measuring device itself.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A position-measuring device, comprising:
a measuring transducer including a scanner configured to be attached to a first object and a measuring standard configured to be attached to a second object such that the scanner scans the measuring standard to determine relative movements between the first and second object, and the measuring transducer being configured to output position measurement values representing a detected change in length or angle of the measuring standard relative to the scanner; and
at least one memory having stored parameter data defining an active configuration of the measuring transducer, the at least one memory further having data and instructions useable to activate at least one further configuration of the measuring transducer such that the position-measuring device is switchable to operate in accordance with the at least one further configuration without accessing an external data source containing configuration data, each of the configurations defining how the position-measuring device is to carry out the position measurement and how the measuring transducer outputs results of the position measurement to an associated external processing unit,
wherein the data and instructions are included in a configuration script, wherein the at least one memory stores an index of the configuration script, and wherein the index is accessible by an external programming unit for displaying the index to a user and allowing the user to select the at least one further configuration to be activated from the index such that the external programming unit does not require information about an internal structure of the position-measuring device to activate the at least one further configuration.

2. The position-measuring device as recited in claim 1, wherein the at least one memory has only a portion of the data which defines a first one of the at least one further configurations associated to the first one of the at least one further configurations and is configured to use data, stored in the at least one memory, of at least one of the active configuration and a second one of the at least one further configurations to activate the first one of the at least one further configurations.

3. The position-measuring device as recited in claim 2, wherein, during the activation of the first one of the at least one further configurations, the position-measuring device is configured to partly overwrite the active configuration using the portion of the data associated to the first one of the at least one further configurations.

4. The position-measuring device as recited in claim 1, wherein the at least one further configuration includes a plurality of different further configurations, the at least one memory including a configuration block having data associated to the plurality of different further configurations and the position-measuring device being configured to access the configuration block to activate each of the plurality of different further configurations.

5. The position-measuring device as recited in claim 1, wherein the at least one further configuration includes a plurality of different further configurations, wherein the data and instructions associated to each of the plurality of different further configurations are combined into the configuration script, and wherein each of the plurality of different further configurations are identified in and selectable from the index of the configuration script via the external programming unit.

6. The position-measuring device as recited in claim 1, wherein the at least one further configuration has an associated access code and the position-measuring device is configured to activate the at least one further configuration only after a user provides the access code.

7. The position-measuring device as recited in claim 1, wherein the position-measuring device has an interface for a processor to activate the at least one further configuration using the data and instructions stored in the at least one memory.

8. The position-measuring device as recited in claim 1, wherein the data and instructions useable to activate the at least one further configuration include data and instructions useable to change in the at least one further configuration, relative to the active configuration, at least one of:
a type of interface through which the position-measuring device interacts with the associated external processing unit;
a resolution of position measurements to be performed using the measuring transducer;
an output format of the position measurement values from the measuring transducer; or
a content of an electronic nameplate.

9. The position-measuring device as recited in claim 1, wherein the data and instructions useable to activate the at least one further configuration include data and instructions useable to at least one of:
deactivate at least one function capable of being performed by the position-measuring device operating in accordance with the active configuration; or
activate at least one function not capable of being performed by the position-measuring device operating in accordance with the active configuration.

10. The position-measuring device as recited in claim 1, wherein the data and instructions useable to activate the at least one further configuration include data and instructions useable to change in the at least one further configuration, relative to the active configuration, a resolution of the position measurement values output by the measuring transducer.

11. The position-measuring device as recited in claim 1, wherein the at least one further configuration of the measuring transducer adapts the position-measuring device to a different application by changing an interface through communication with the processing unit is to occur.

12. A programmable system, comprising:
a position-measuring device comprising:
a measuring transducer including a scanner configured to be attached to a first object and a measuring standard configured to be attached to a second object such that the scanner scans the measuring standard to determine relative movements between the first and second object, and the measuring transducer being configured to output position measurement values representing a detected change in length or angle of the measuring standard relative to the scanner;
at least one memory having stored parameter data defining an active configuration of the measuring transducer, the at least one memory further having data and instructions included in a configuration script useable to activate at least one further configuration of the measuring transducer such that the position-measuring device is switchable to operate in accordance with the at least one further configuration without accessing an external data source containing configuration data, each of the configurations defining how the position-measuring device is to carry out the position measurement and how the measuring transducer outputs results of the position measurement to an associated external processing unit, the at least one memory further storing an index of the configuration script; and a processor of an external programming unit connectable to the position-measuring device and configured to activate the at least one further configuration using the configuration script stored in the at least one memory of the position-measuring device based on a user having selected the at least one further configuration from the index which is displayed to the user via a display of the external programming unit such that the external programming unit does not require information about an internal structure of the position-measuring device to activate the at least one further configuration.

13. The programmable system as recited in claim 12, wherein the at least one further configuration includes a plurality of different further configurations, wherein the data and instructions associated to each of the plurality of different further configurations are combined into the configuration script, wherein each of the plurality of different further configurations are identified in the index of the configuration script, and wherein the display of the external programming unit is configured to display the index as a selection menu.

14. The programmable system as recited in claim 12, wherein the external programming unit is implemented by a data processing program in the associated external processing unit which is configured to receive measurement values while the position-measuring device is in a measurement mode.

15. A method for programming a position-measuring device, the method comprising:

connecting an external programming unit having a processor to the position-measuring device, the position-measuring device comprising:

a measuring transducer including a scanner configured to be attached to a first object and a measuring standard configured to be attached to a second object such that the scanner scans the measuring standard to determine relative movements between the first and second object, and the measuring transducer being configured to output position measurement values representing a detected change in length or angle of the measuring standard relative to the scanner, and at least one memory having stored parameter data defining an active configuration of the measuring transducer, the at least one memory further having data and instructions included in a configuration script useable to activate at least one further configuration of the measuring transducer such that the position-measuring device is switchable to operate in accordance with the at least one further configuration without accessing an external data source containing configuration data, each of the configurations defining how the position-measuring device is to carry out the position measurement and how the measuring transducer outputs results of the position measurement to an associated external processing unit, the at least one memory further storing an index of the configuration script;

displaying the index on the external programming unit such that the at least one further configuration to be activated is selectable from the index by a user of the external programming unit such that the external programming unit does not require information about an internal structure of the position-measuring device to activate the at least one further configuration; and executing, by the processor, the instructions which are associated with a first one of the at least one further configurations so as to activate the first one of the at least one further configurations.

16. The method as recited in claim 15, wherein, during the executing the instructions, the processor accesses only data stored in the at least one memory.

17. The method as recited in claim 15, wherein the at least one further configuration includes a plurality of different further configurations, the method further comprising:

combining the data and instructions of the plurality of further different configurations into the configuration script in the position-measuring device, the configuration script having the associated index, the index containing names which identify each of the plurality of different further configurations; and displaying the names on a display of the programming unit.

* * * * *